J. HARRIGAN.
MANURE RECEPTACLE.
APPLICATION FILED SEPT. 3, 1909.
957,772.
Patented May 10, 1910.
4 SHEETS—SHEET 2.
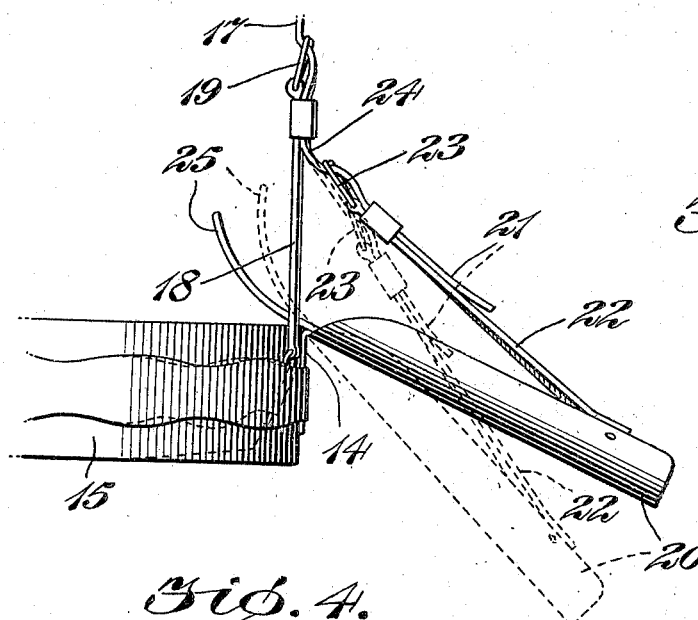
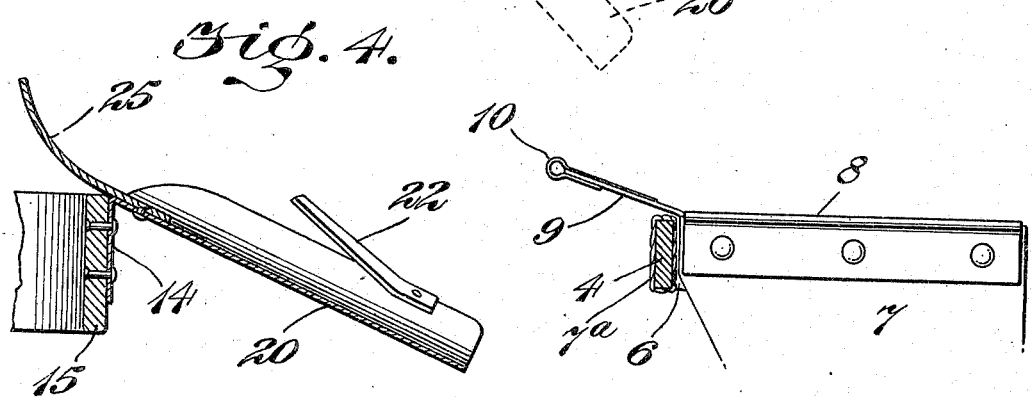
WITNESSES
INVENTOR
John Harrigan
ATTORNEY

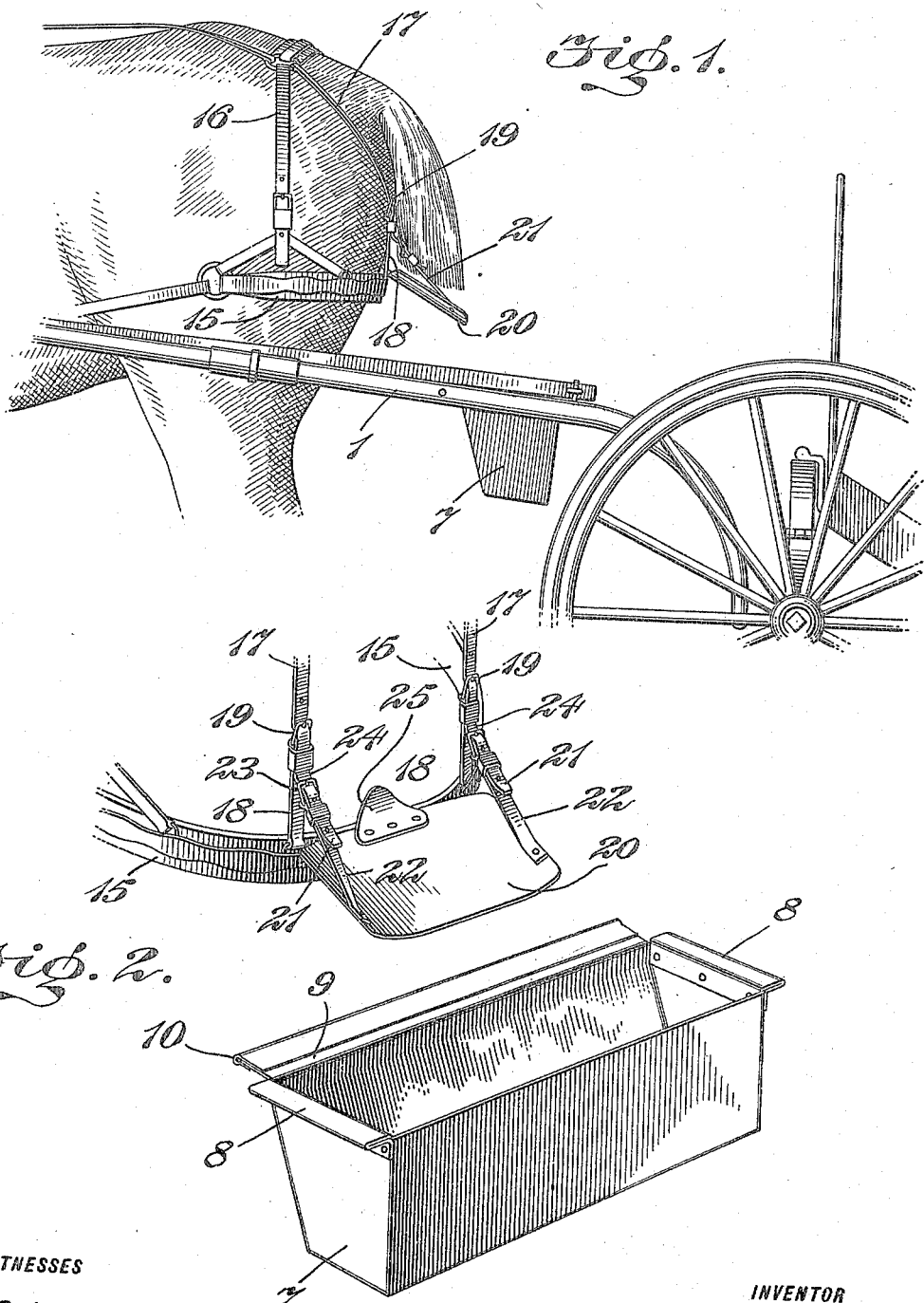

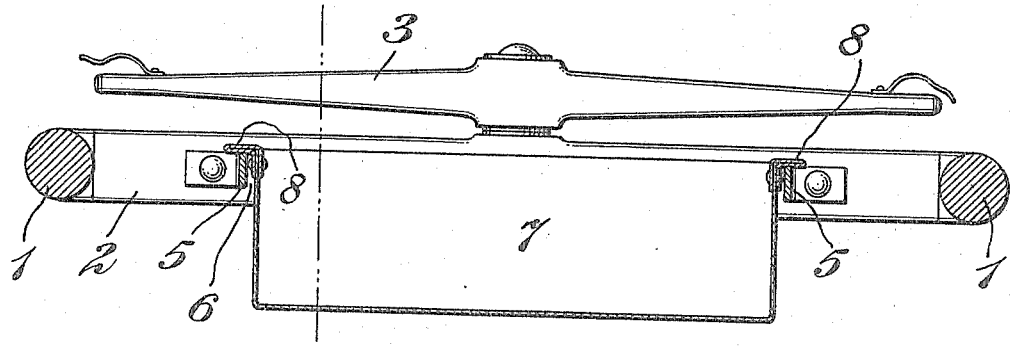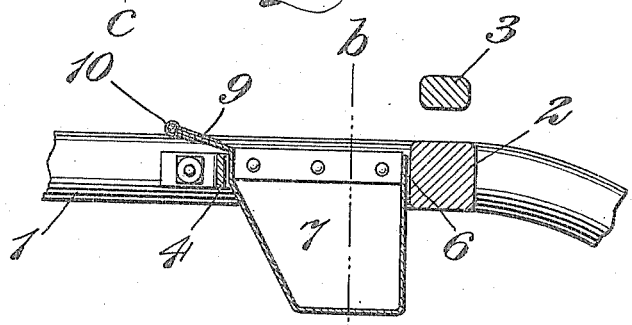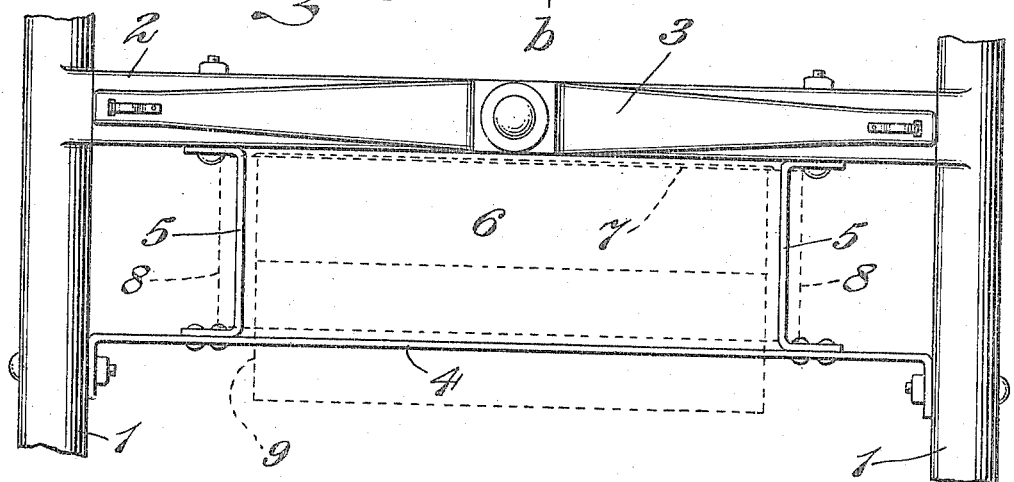

J. HARRIGAN.
MANURE RECEPTACLE.
APPLICATION FILED SEPT. 3, 1909.
957,772.
Patented May 10, 1910.
4 SHEETS—SHEET 4.
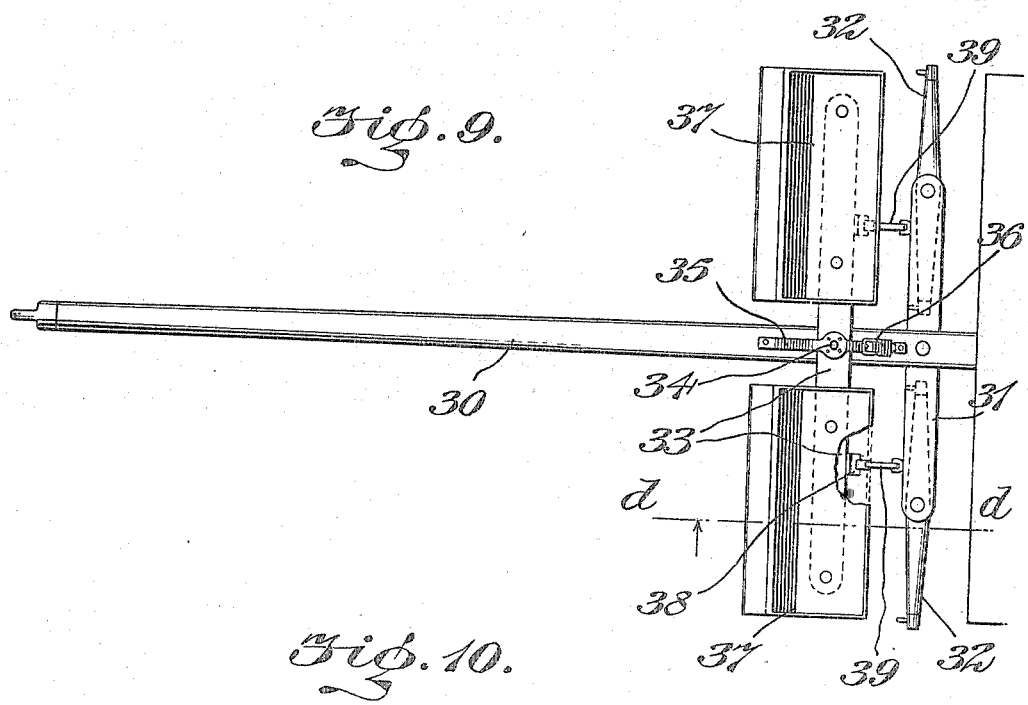
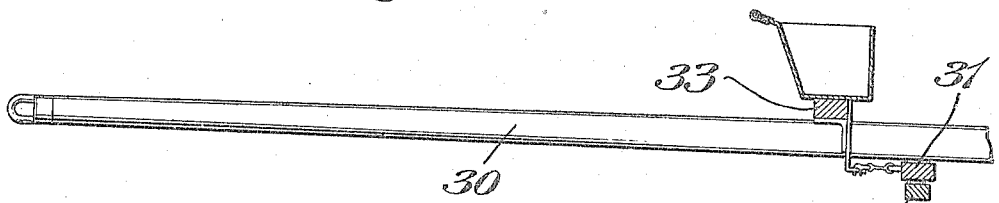
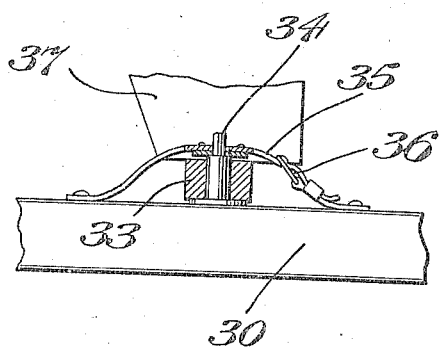
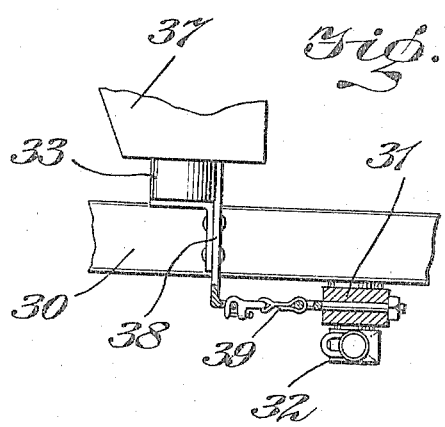
WITNESSES
INVENTOR
John Harrigan
BY
ATTORNEY

UNITED STATES PATENT OFFICE.

JOHN HARRIGAN, OF BROOKLYN, NEW YORK.

MANURE-RECEPTACLE.

957,772. Specification of Letters Patent. Patented May 10, 1910.

Application filed September 3, 1909. Serial No. 516,034.

*To all whom it may concern:*

Be it known that I, JOHN HARRIGAN, a citizen of the United States, and a resident of Brooklyn, in the county of Kings and State of New York, have invented certain Improvements in Manure-Receptacles, of which the following is a specification.

This invention relates to certain improvements in that class of devices which are particularly designed and adapted for use in connection with vehicles drawn by draft animals, for receiving and retaining the droppings from such animals, and for preventing the falling and scattering of such droppings to and along the street or roadway, and the object of the invention is to provide a device of this general character of a simple and comparatively inexpensive nature, and of a compact, strong and durable construction which shall serve to effectively receive and retain such droppings and prevent the falling thereof to the roadway, and which shall at the same time be capable of being produced in such an inconspicuous and unobtrusive form as will not attract undue notice of passers-by or materially detract from the appearance of the vehicle in connection with which the device is employed.

The invention consists in certain novel features of the construction, and combinations and arrangements of the several parts of the improved manure receiving and retaining device, whereby certain important advantages are attained and the device is rendered simpler, less expensive, and otherwise better adapted and more convenient and effective for use, all as will be hereinafter fully set forth.

In order that my invention may be the better understood, I will now proceed to describe the same with reference to the accompanying drawings, wherein—

Figure 1 is a fragmentary side elevation showing the application of my improvements for use in connection with a one-horse vehicle such, for example, as a buggy or the like; Fig. 2 is a fragmentary perspective view, drawn upon an enlarged scale and illustrating certain features of construction of my improved manure receiving device which will be hereinafter described; Fig. 3 is an enlarged fragmentary side elevation illustrating in greater detail certain features of the device shown in Fig. 1; Fig. 4 is a sectional detail view taken through the chute member of the device and illustrating the connection of the upper edge thereof with the seat-strap of the breeching, the plane of the section being indicated by the line *a—a* in Fig. 5; Fig. 5 is a rear edge view of the chute member of the device; Fig. 6 is a sectional view drawn upon an enlarged scale and taken vertically and transversely through the shafts of the vehicle and illustrating certain details of the means for supporting the can or receptacle proper in position between said shafts, the plane of the section being indicated by the line *b—b* in Fig. 7; Fig. 7 is a sectional view taken vertically through the parts illustrated in Fig. 6 in a plane between and parallel with the shafts of the vehicle, as indicated by the line *c—c* in Fig. 6; and Fig. 8 is a plan view of the devices shown in Figs. 6 and 7. Fig. 9 is a plan view showing a modified form of my invention, the same being adapted for use in connection with a two-horse vehicle, and showing two of the cans or receptacles in position for use; Fig. 10 is a sectional view taken vertically through one of the cans or receptacles in a plane parallel with the pole of the vehicle, as indicated by the line *d—d* of Fig. 9; Fig. 11 is a sectional detail view illustrating the means for pivotally mounting the cross-piece, supporting the cans or receptacles, upon the pole of the vehicle, and Fig. 12 is a fragmentary detail view illustrating the means for connecting the double-tree to the cross-piece supporting the cans or receptacles, whereby said double-tree and cross-piece may move in unison.

Although in Figs. 1 to 8 I have illustrated my invention applied for use in connection with a one-horse vehicle, such, for example, as a buggy or similar vehicle where the draft animal is positioned between shafts, I do not desire to be understood as limiting myself in this respect, since it will be apparent that my improvements may also be applied with facility for use in connection with vehicles of various other kinds and styles, and for such use is susceptible of such changes and modifications as may be requisite to adapt the device to such other types and styles of vehicles without material departure from the principles and spirit of the invention as defined in the appended claims.

In the embodiment of my invention illustrated in Figs. 1 to 8, 1 represents the shafts or thills of the vehicle, and 2 represents the cross bar connecting the rear ends of the same back of the draft animal, while 3 represents the whiffle-tree supported upon said bar 2 in the usual way for connection with the traces. 4 represents a metal bar or strip extended between the rear ends of said shafts 1, 1 parallel with the cross bar 2, but spaced apart therefrom as clearly indicated in Figs. 7 and 8, and 5, 5 represent other metal strips of less length than said strip 4, and extended between the same and the cross bar 2, parallel with and adjacent to, but spaced inside of the respective shafts 1, 1. By this structure, the strips or bars 4, and 5, 5, being of sufficient strength, and properly bolted or riveted at their extremities, as indicated in the drawings, afford a rectangular open space or well immediately in front of the cross bar 2 and between the shafts, as clearly shown at 6 in the drawings, in which space or well is adapted to be received a sheet metal can or receptacle 7 wherein the droppings of the draft animal are to be received and retained as will be hereinafter explained. By this construction the can or receptacle is securely held in position in the space or well 6, being provided with outwardly directed flanges 8, 8, extended along the upper edges of its end walls and adapted to rest upon the short end bars or strips 5, 5 and with a similar flange 9, forwardly directed from its forward upper edge and adapted to rest upon the forward transverse bar or strip 4 in such a manner that said can or receptacle is effectively supported.

The proportions of the parts are such that the walls of the can or receptacle 7 are caused to fit snugly between the bars 2 and 4 at its rear and forward sides, and between the strips 5, 5 at its ends, so that rattling of the can when the same is in place and during the movement of the vehicle, is effectively avoided. As a further preventive of such rattling, the bars or strips 4 and 5, and if need be, the bar 2, may be wrapped with cord as indicated at 7ª in Fig. 3, so as to prevent contact of the can against the metallic parts and thereby not merely prevent such rattling, but also more effectively retain the can or receptacle in position in the well 6 during use of the device.

The can or receptacle 7, while being securely held in the well or space 6 during the use of the device, may be quickly and conveniently lifted therefrom when desired, in order that its contents may be emptied from time to time, and in order to prevent possible injury to the animal from contact of the forward flange 9 with the animal's rear legs, I have shown said flange provided with a cushion 10 of soft or resilient material extended along its forward edge portion. Where the parts of the device are properly adjusted and proportioned, however, there is but small likelihood of such contact upon said flange.

15 represents the seat-strap forming part of the harness of the draft animal, and 16 represents the hip-strap, one of which is provided at either side of the animal in the ordinary way, to support the forward ends of said seat-strap or breeching 15, while 17, 17 represent auxiliary breeching supports or buttock-straps, which are extended down over the buttocks of the animal at opposite sides of the tail and which have connection with the rear part of the breeching or seat-strap 15 in such a way as to effectively support the central part thereof.

As shown herein, the buttock-straps 17, 17 are suitably spaced apart from each other, and are adjustably engaged at their lower ends with buckles 19, 19, carried at the upper ends of short straps 18, 18, the lower ends whereof are secured to the breeching or seat strap 15, as clearly shown in Figs. 2 and 3. The lower straps 18, 18 are obviously comprised in the buttock-straps 17, 17 and the longitudinal adjustment of such straps afforded by the buckles 19, 19 permits accurate adjustment and positioning of the breeching 15 in a vertical direction and prevents sagging of the central part thereof such as might interfere with the operation of my improvements.

20 represents a chute member comprised in my present invention, being formed, as herein shown, from a thin metal plate of general rectangular formation, the opposite edges of which are slightly bent upward to impart a concave surface to its uppermost side, and as herein shown, the forward edge portion of this plate or member 20 is provided with an integral pendent flange 14, which is extended down outside of and at the rear of the central portion of the breeching or seat-strap 15 and secured thereto in any preferred manner, so as to afford an effective connection of the said forward edge of said chute member 20 with said breeching 15. The chute member or plate 20, being extended in a downwardly and rearwardly inclined direction behind the breeching 15 is in position to receive upon its upper surface the droppings of the animal and to guide such droppings downwardly in order to insure the deposition thereof within the receptacle or can 7, wherein they are retained and prevented from being scattered upon the roadway, and as clearly shown in the drawings, said chute member 20 is supported at such an elevation by the seat-strap or breeching 15 that its lower end is at such an elevation above the upper part of said can or receptacle 7 as will prevent contact of the two parts during the movement of the vehicle. At its upper edge, adjacent to its connection with the breeching, the chute member has a centrally arranged forwardly and upwardly directed member 25 projecting from it above said breeching, and adapted, during the use of the device, to be extended a sufficient distance between the buttocks of the animal to effectively guide and direct the droppings upon said chute member, and thereby to prevent the same from falling in front of or upon the breeching. This member 25 may be formed advantageously from leather or the like soft material in order that it may not unduly chafe or cut the animal. In this way the droppings are effectively guided into the can or receptacle, and noise or rattling such as might be caused by contact of the metal chute member upon the can or receptacle, and which might tend to frighten the draft animal, or attract the attention of passers-by, is entirely avoided. Should there, by any accident, be contact of such parts, however, the noise which would otherwise be produced will be deadened by the interposition of the cushion 10 upon the forward edge flange 9 of the can or receptacle.

For supporting the chute member 20 in its inclined position, as shown in the drawings, I provide strap connections 21, 21, extended up from the opposite lateral portions thereof, in a forwardly inclined direction to the auxiliary breeching straps or buttock straps 17, 17. As herein shown, these supporting members 21, 21, comprise straps 22, 22 affixed to the upturned lateral edge portions of the chute member 20 in any approved way and provided with buckles 23, 23, at their upper ends, wherewith are engaged the lower perforated extremities 24, 24 of the buttock straps 17, 17, which depend sufficiently below the buckles 19, 19, for such connection with buckles 23, 23. By this construction material simplicity is attained, while the rear portion of the seat-strap or breeching may be vertically adjusted in a convenient way, and the length of the supporting members 21, 21, may also be conveniently and quickly adjusted in order that the inclination of the chute member, or the approach of its lower end to the can or receptacle 7 may be varied at will.

In Figs. 9 to 12, inclusive, I have shown the application of my improvements for use in connection with a vehicle to be drawn by two or more horses and provided with a pole 30 to be extended between the horses in a well known way. 31 represents the usual double-tree pivotally connected with the pole at the rear of the team and having its opposite ends pivotally connected with the swingle-trees 32, 32, wherewith the traces of the respective horses are connected.

According to my improvements, in the embodiment of my invention herein illustrated, I provide a cross beam or support 33 extended above the pole 30 slightly in advance of the double-tree 31 and having its central portion apertured for detachable engagement with a pivot pin or bolt 34 extended upwardly from the pole, a strap 35 being adapted to be extended across the top of said cross beam 33 and having an apertured portion engageable with the upper extremity of the pivot pin 34 so as to serve for holding the cross beam securely in position upon the pole during practical use of the device.

36 represents a buckle engaged with the strap 35 for holding the same securely in position upon the top of the cross beam so as to prevent the same from being displaced during the use of the device. Where this construction is employed it is evident that the buckle may be readily disengaged from the strap so that the latter may be lifted to permit the cross beam to be removed from the pole when desired.

The opposite extremities of the cross beam 33 are extended outwardly beyond the opposite sides of the pole 30 and serve as supports for cans or receptacles 37, 37, each of which is constructed with substantial similarity to the can or receptacle 7 above referred to, and is opened at its top and positioned behind one of the draft animals at a suitable elevation and at an appropriate distance therefrom to receive the droppings of such animals. In practice it may be advisable to form the cans or receptacles 37, 37, of a construction similar to that now under construction in a somewhat greater length than the single can or receptacle 7 for a one-horse vehicle.

In the construction shown in Figs. 9 to 12, the double-tree is suspended beneath the pole 30 at its pivotal connection therewith while the cross beam 33 is rested upon the top surface of the pole in order to facilitate its removal therefrom, and at opposite ends said cross beam 33 is provided with pendent brackets 38, 38 positioned substantially in alinement with the connections of the swingle-trees at opposite ends of the double-tree, the lower extremities of said brackets 38 being apertured for detachable connection with the extremities of the double-tree, so that the double-tree is moved pivotally upon the pole by the variable draft exerted by the draft animal at opposite ends thereof, the cross beam 33 is correspondingly moved in order that the cans or receptacles 37, 37, at opposite ends thereof may be maintained in proper relative position to the respective draft animals. As herein shown the detachable connections between the ends of the double-tree 31 and the corresponding ends of the cross-beam 33, indicated at 39, 39, comprise snap hooks which are capable of convenient engagement with and disengagement from the apertures at the lower ends of the brackets 38, 38.

The chute members and various other appliances connected with the harness of the draft animals may, for this embodiment of my invention, be substantially similar to that heretofore described with reference to Figs. 1 to 5 of the drawings, and for this reason I have not considered it necessary to illustrate such appliances in connection with the structure shown in Figs. 9 to 12. Where this construction is provided the droppings from the respective draft animals are accurately guided into and received and retained by the cans or receptacles 37, and are prevented from being strewn over the pavements, and when desired the movement of the cans or receptacles in unison with the double-tree, insuring the accurate positioning thereof at all times, and when desired the cross beam 33 carrying the cans or receptacles upon its opposite ends, may be readily disconnected from the pole and double tree and may be removed from the vehicle in order that the receptacles may be conveniently emptied and cleaned.

From the above description it will be seen that the manure receiving and retaining device constructed according to my invention is of an extremely simple and comparatively inexpensive nature and is capable of being produced in such a form as will effectively avoid the production of noise or rattling during use of the vehicle, and will not attract undue notice of passers-by, and it will also be obvious from the above description that the device is susceptible of some modification without material departure from the principles and spirit of the invention and for this reason I do not desire to be understood as limiting myself to the precise formation and arrangement of the several parts of the device herein set forth in carrying out my invention in practice.

Having thus described my invention, what I claim and desire to secure by Letters Patent is—

1. A device of the character described having a receptacle, means for supporting said receptacle behind a draft animal capable of operation to compel movement of said receptacle with the animal during travel, and a chute member supported in inclined position behind such draft animal and adapted to receive droppings, and having its lower part unconnected with the receptacle and out of contact therewith but adapted to direct such droppings into said receptacle.

2. A device of the character described having a receptacle, means for supporting said receptacle behind a draft animal capable of operation to compel movement of said receptacle with said animal during travel, a chute member adapted to receive droppings and having its lower part unconnected with the receptacle and out of contact therewith but adapted to direct such droppings into the receptacle, and means adapted for connection with the animal for supporting said chute member in inclined position behind the draft animal.

3. A device of the character described having a receptacle, means for supporting said receptacle behind a draft animal capable of operation to compel movement of said receptacle with said animal during travel, a chute member adapted to receive droppings and having its lower part unconnected with the receptacle and out of contact therewith but adapted to direct such droppings into the receptacle, and having its upper end provided with a projecting member adapted to be extended between the buttocks of the animal and means for supporting said chute member in inclined position behind the draft animal.

4. A device of the character described having a receptacle adapted to be supported behind a draft animal, a chute member adapted to receive droppings and having its lower part unconnected with the receptacle and out of contact therewith, but adapted to direct such droppings into the receptacle, and means connected with the harness of the draft animal for supporting said chute member in inclined position behind said animal.

5. A device of the character described having a receptacle adapted to be supported behind a draft animal, a chute member adapted to receive droppings and having its lower part unconnected with the receptacle and out of contact therewith but adapted to direct such droppings into the receptacle, and means connected with the harness of the draft animal for supporting said chute member in inclined position behind said animal and capable of adjustment to permit of varying the inclination of said chute member.

6. A device of the character described having a receptacle, means for supporting said receptacle behind a draft animal capable of operation to compel movement of said receptacle with said animal during travel, a chute member adapted to receive droppings and inclined to direct the same into the receptacle, and having its lower end unconnected with the receptacle, and means for supporting the chute member upon the animal capable of operation to vary the inclination at which said chute member is supported.

7. A device of the character described having a receptacle, means for supporting said receptacle behind a draft animal capable of operation to compel movement of said receptacle with said animal during travel, a chute member adapted to receive droppings and supported at its forward part and extended in a downwardly inclined direction toward the receptacle to direct such droppings thereinto, and inclined adjustable supports affording supporting connection between the harness of the animal and the rear part of said chute member.

8. A device of the character described having a receptacle adapted to be supported behind a draft animal, a breeching, a chute member supported by the breeching at its forward part and extended in a downwardly inclined direction toward the receptacle to direct droppings thereinto, buttock straps extended upwardly from the breeching, and inclined supports adjustably connected at their upper parts with said buttock straps, and having their lower parts connected with the chute member.

9. A device of the character described having a plurality of connected receptacles adapted to be supported side by side behind draft animals in position to receive droppings therefrom, and means adapted for connection with the respective draft animals and capable of operation to compel movement of each receptacle in unison with the animal behind which it is positioned.

10. A device of the character described having a plurality of spaced receptacles adapted to be supported side by side behind draft animals in position to receive droppings therefrom, a connection extended between the receptacles, and means adapted for connection with the respective draft animals and capable of operation to compel movement of each receptacle in unison with the animal behind which it is positioned.

11. A device of the character described having a plurality of receptacles adapted to be supported side by side behind draft animals in position to receive droppings therefrom, a connection extended between the receptacles, a pivotal support for said connection positioned between the receptacles, and means adapted for connection with the respective draft animals and capable of operation to compel movement of each receptacle in unison with the animal behind which it is positioned.

12. A device of the character described having a plurality of receptacles adapted to be supported side by side behind draft animals in position to receive droppings therefrom, a double-tree having opposite ends adapted for connection with the respective draft animals, and connections extended from the opposite ends of the double-tree to the respective receptacles, and capable of operation to communicate the movement of said double-tree to the respective receptacles.

13. A device of the character described having a plurality of receptacles adapted to be supported side by side behind draft animals, a double-tree having opposite ends adapted for connection with the respective draft animals, a part extended between and affording connection between the respective receptacles, and connections extended from opposite ends of the double tree to the respective receptacles and capable of operation to communicate the movement of the double-tree to said receptacles.

14. A device of the character described having a plurality of receptacles adapted to be supported behind draft animals in position to receive droppings therefrom, a connection extended between the respective receptacles, a support engaged with said connection between the receptacles, a double-tree having opposite ends adapted for connection with the respective draft animals, and connections extended from opposite ends of the double-tree to the respective receptacles and capable of operation to compel movement of the respective receptacles in unison with said double-tree.

15. A device of the character described having a plurality of receptacles adapted to be supported behind draft animals in position to receive droppings therefrom, a supporting part extended between the receptacles, a pole having detachable pivot connection with said supporting part, a double-tree having pivotal connection with the pole and having its opposite ends adapted for connection with the respective draft animals, and means for compelling movement of the supporting part in unison with said double-tree.

16. A device of the character described having a plurality of receptacles adapted to be supported behind draft animals in position to receive droppings therefrom, a pole extended between the receptacles, means for supporting the receptacles from said pole, and means affording connection between the receptacles and the respective draft animals and capable of operation to compel movement of each receptacle in unison with the movement of the draft animal behind which it is supported.

17. A device of the character described having a plurality of receptacles adapted to be supported behind draft animals in position to receive droppings therefrom, a pole extended between the receptacles, a supporting part affording connection between the receptacles and having pivotal support at its central portion pivotally supported by the pole, and means for connecting the receptacles with the respective draft animals, capable of operation to compel movement of each receptacle in unison with the draft animal behind which it is supported.

18. A device of the character described having receptacles adapted to be supported side by side behind draft animals in position to receive the droppings therefrom, a pole extended between the receptacles, detachable means for supporting the receptacles upon the pole, and means for connecting the receptacles with the respective draft animals, capable of operation to compel movement of each receptacle in unison with the animal behind which it is supported.

19. A device of the character described having receptacles adapted to be supported side by side behind draft animals in position to receive droppings therefrom, a pole extended between the receptacles, a cross beam affording connection between the receptacles and removably supported by the pole, a double-tree pivotally connected with the pole and having end portions extended behind the cross beam and adapted for connection with the respective draft animals and detachable connections extended from the receptacles to said double-tree and capable of operation to compel movement of the respective receptacles in unison therewith.

In witness whereof I have hereunto signed my name in the presence of two subscribing witnesses.

JOHN HARRIGAN.

Witnesses:
J. D. CAPLINGER,
C. F. CONNETT.